United States Patent [19]

Wilson

[11] Patent Number: 5,486,068
[45] Date of Patent: Jan. 23, 1996

[54] PROCESS FOR TREATING WASTE MATERIALS WITH CONCENTRATED ACID AND THE PRODUCT PRODUCED THEREBY

[75] Inventor: Harold W. Wilson, El Paso, Tex.

[73] Assignee: Soil and Water Management, Inc., Chicago, Ill.

[21] Appl. No.: 145,218

[22] Filed: Nov. 3, 1993

[51] Int. Cl.$^6$ .............................. B09B 3/00; C05F 11/00
[52] U.S. Cl. ............................................. 405/129; 71/23
[58] Field of Search .................... 405/128, 129, 405/258, 263, 264; 71/11–14, 23–25

[56] References Cited

U.S. PATENT DOCUMENTS

| | | | |
|---|---|---|---|
| 128,752 | 7/1872 | Pratt et al. | |
| 2,362,390 | 11/1944 | Millar | 71/25 |
| 2,985,643 | 5/1961 | Boomer | 260/124 |
| 3,218,149 | 11/1965 | Sproull et al. | 71/23 |
| 3,758,287 | 9/1973 | Scheel | 71/12 |
| 4,343,646 | 8/1982 | Leonard | 71/25 |
| 4,743,287 | 5/1988 | Robinson | 71/12 |
| 5,051,031 | 9/1991 | Schumacher et al. | 405/129 |
| 5,161,915 | 11/1992 | Hansen | 405/129 |

*Primary Examiner*—George A. Suchfield
*Attorney, Agent, or Firm*—Jacobson, Price, Holman & Stern

[57] ABSTRACT

A process for treating wood, particularly wood wastes (such as sawdust and the like), and/or paper, particularly waste paper (such as newsprint), and/or other types of polysaccharides (matter composed essentially of cellulose and lignin), preferably available as "wastes", with concentrated sulfuric acid (93 to 98.5% $H_2SO_4$), or with concentrated phosphoric acid (75 to 85% $H_3PO_4$), or various mixtures of these acids in their concentrated forms. The product of the process can be used for treating agricultural soils or as a landfill.

33 Claims, No Drawings

PROCESS FOR TREATING WASTE MATERIALS WITH CONCENTRATED ACID AND THE PRODUCT PRODUCED THEREBY

The present invention relates to processes for converting lignocellulose compounds, primarily waste newsprint, computer waste paper, waste paper in general, and waste wood such as saw dust and shredded wood into chemical compounds highly suitable for use among other applications in the beneficial treatment of all kinds and types of agricultural soils.

The present invention also relates to an unlimited number of new and extremely useful compositions-of-matter presently non-existent and unknown which can be produced by treating wood, particularly wood wastes (such as sawdust and the likes), and/or treating paper, particularly waste paper (such as newsprint), and/or treating other types of polysaccharides (matter composed essentially of cellulose and lignin), preferably available as "wastes" with concentrated sulfuric acid (93 to 98 5% $H_2SO_4$), or with concentrated phosphoric acid (75 to 85% $H_3PO_4$), or with various combinations or mixtures of these acids in their concentrated forms. The invention further contemplates that mixtures of wood waste and newspaper wastes treated with defined quantities of the concentrated phosphoric acid can be physically admixed with mixtures of wood and/or paper wastes that have already been treated with defined quantities of concentrated sulfuric acid to result in compositions-of-matter that demonstrate sources of soluble and available-to-plants (in soils) phosphorous pentoxide form of phosphorous in hydrate form; of soluble combined and uncombined phosphoric acid ($H_2PO_4$); of soluble combined and uncombined sulfuric acid ($H_2SO_4$); of hydrolyzed decomposed and partially undecomposed forms of organic matter; of available nitrogen; of lignin and certain ligno-organic compounds; of acetic acid; of both phosphoric and sulfur acid esters of cellulose and lignin; and additionally of sources of an extremely wide variety and number of both inorganic and organic chemical compounds all able to work in concert chemically and biologically when applied to agricultural soils in general to effect positive soil amendment, fertilization, improvement through the agency of pH control, and overall enhancement of soils to provide optimum conditions for plant growth in such treated soils. A multiple number of additional properties, both chemical and physical can be attributed to and demonstrated by the inventive compositions-of-matter which have been produced by combining the above noted polysaccharide containing substances with the concentrated acids previously described.

The compositions-of-matter obtainable from use of the concerned processes can be made to contain variable amounts ranging between fractions of a percent to more than sixty (60%) percent of either concentrated sulfuric acid ($H_2SO_4$), concentrated phosphoric acid ($H_3PO_4$), or preselected mixtures of various amounts of both concentrated sulfuric acid and phosphoric acid in chemical and in physical combinations with the above noted lignocellulose compounds. Additionally, upon treatment of the lignocellulose and cellulose compounds singularly as waste newsprint alone, or as admixtures such as mixtures of sawdust, newsprint, and waste computer paper in any and all variations of kinds and amounts of each component in such mixtures by the present process with varying amounts of concentrated sulfuric acid (93–98.5%), concentrated phosphoric acid (75–85% $H_3PO_4$), or with mixtures of varying amounts of these two named concentrated forms of acids the resultant compositions-of-matter are also made to contain various contents of highly adsorbent carbonaceous matter including organic chemical compounds such as sulfuric and/or phosphoric acid esters of cellulose and lignin, pyrolytic products of reaction and heat decomposition, products of hydrolysis such as mixed aldehydes, ketones, degraded sugars and various organic acids such as acetic acid, all in combination with activated carbon and carbonaceous compounds having large capacities for adsorption of the many different highly water soluble acidic materials present in wide variations of kinds and amounts found in the end products. Further, due primarily to the very large quantities possible of hydrolyzable and readily reactable acid made present in the product derivable from use of the described treatment of lignocellulose and cellulose compounds in general with concentrated sulfuric acid and/or concentrated phosphoric the resultant products are able to readily combine with all kinds of basic compositions-of-matter partially as may be desired or to the full extent of their contents of neutralizable and reactable acid contents to form an almost unlimited number of product derivatives for use as prepared, or to be modified for an additional number of usages. For example: A dry, solid product which is made to contain an equivalency of approximately 60% $H_2SO_4$ can be made to react with variations of amounts of hydrated ammonia ($NH_4OH$) to product compositions-of-matter having varying contents as desired of ammonium sulfate, $(NH_4)_2SO_4$ in physical combination with amounts (as desired) of reactable but uncombined sulfuric acid per se. For example: By treating a mixture of 75 grams of cellulosic compounds consisting of by weight, one-third dry, ground wood; one-third dry, shredded newsprint; one-third water with 50 grams of concentrated sulfuric acid (98% $H_2SO_4$), then drying this mixture at a temperature of 225°–250° F., a product is obtained having a weight of approximately 100 grams with an acidity equivalence of 49% expressed as sulfuric acid ($H_2SO_4$). This entire product can be sprayed with a sufficient amount of hydrated ammonia ($NH_4OH$) solution to cause approximately one-half of the total sulfuric acid content to be neutralized to leave the other one-half of the acid content to remain unneutralized sulfuric acid-($H_2SO_4$) per se.

49 gm. $H_2SO_4$ + 17.5 gm. $NH_4OH \longrightarrow$ 33 gm. $(NH_4)_2SO_4$ +   Equation 1

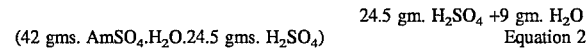

(42 gms. $AmSO_4.H_2O$.24.5 gms. $H_2SO_4$)      24.5 gm. $H_2SO_4$ +9 gm. $H_2O$       Equation 2

(66.5 gms. ammonium sulfate acid hydrate)

Or, similarly, in the event the lignocellulosic compounds are treated with concentrated phosphoric acid ($H_3PO_4$), the resultant products can be totally neutralized to form ammonium and ammonium acid phosphate salt derivatives; or the acid can be only partially neutralized to form products containing variable amounts of a mixture of neutralized ammonium phosphate compounds and non-neutralized phosphoric acid per se in the presence of the lignocellulosic matter. Nitrogen-containing basic compounds such as urea can be admixed with the acidic products of concentrated acid processed lignocellulose to result in the formation of urea sulfate and/or urea phosphate amide salts of variable compositions depending upon the selected acid, the amount used, and the amount of urea or other nitrogen-containing compounds used in such treatments. In the case of using the acid-lignocellulose compounds for converting tricalcium phosphate-$Ca_3(PO_4)_2$ (instead of using the conventional treatment with aqueous sulfuric acid) into single-super, or into triple-super phosphates, this can be achieved with use of the present invention by combining requisite amounts of acidized lignocellulose either by use of sulfuric acid alone or by using mixtures of sulfuric and phosphoric acids in concentrated forms with the lignocellulose and then adding this acidized mixture to tricalcium phosphate as stoichiometric requirements demand for the conversion into the acid forms of available phosphate products. Such products in addition to having the contents of phosphate in plant-available form will also have contents of activated carbon, carbonaceous matter and organic matter holding the available phosphate as acid phosphate by adsorption and absorption in a cellulosic-acid matrix which has a longer "life" in the soil profile than is displayed by "conventional superphosphate" products.

The almost unlimited number of chemical products obtainable from use of this invention with products being made in the form of solid compositions-of-matter and which display a multiple number of variations of both qualities and quantities (as may be desired) of physically (absorbed and non-adsorbed) and chemically combined and uncombined sulfuric and/or phosphoric acids along with contents of primary and secondary plant nutrients (phosphorous, sulfur, and nitrogen as desired) all in physical and chemical combinations with acidized, degraded, and partially carbonized lignocellulose are unknown and absent from the marketplace. These products with their combination of activated carbon and organic matter display extremely high adsorption and absorption capacities which not only promote soil beneficiation but alter, modify, and directly assist regulation of soil pH because of their contents of variable amounts of soluble, available, and hydrolyzable acids which in turn promote ion exchange reactions, enhances soil structures through stabilization of soil framework, and increases both water penetration and water retention. At the same time, allowances are made in the treated soils to permit an enhanced state of plant nutrient retention for ready availability to plants while amplifying plant support and other requirements for optimum plant growth. Further, the water soluble and reactable acid contents of the products which can be made by the processes of this invention are capable of acidification of additional amounts of similar or dissimilar cellulose and lignocellulose materials in addition to being capable of reacting with other reactable substances (such as free alkali in soils). For example, approximately 850 grams of representative product was made by use of the concerned processes where 350 grams of sawdust having a water content of approximately 35% were combined with 650 grams of concentrated sulfuric acid (98.5% $H_2SO_4$) with the concentrated sulfuric acid being poured in one constant stream directly upon the sawdust while the two substances were thoroughly combined. The resultant mixture was air dried at temperatures between 225° and 300° F. to result in approximately 850 grams of free flowing, dry product having a soluble acid equivalence of approximately 70% expressed as percentage $H_2SO_4$. The product contained a percentage of water soluble compounds of approximately 82% of which, in addition to the sulfuric acid, consisted of water soluble organic compounds and a small content of acid bound water. The water insoluble matter amounting to approximately 17% consisted of a mixture of approximately 45% activated carbon and 55% activated organic carbonaceous matter with an ash content determined to amount to approximately 0.5% of the water insoluble matter. Four hundred twenty five grams of the acidified product made and defined as noted above were intimately combined with 650 grams of wet, shredded corrugated cardboard which was first prepared by combining approximately 425 grams of dry shredded cardboard with approximately 225 grams of water. The resultant mixture of the wetted cardboard with the 425 grams of acidified product after intimate combination was dried at temperatures in the range of between 225° and 300° F. to give a product weighing approximately 825 grams. Upon examination, this product showed a content of 34.8% acid expressed as sulfuric acid ($H_2SO_4$) and had a water solubility of approximately 40%.

The above information describes the additional usability of acidified products containing both combined and uncombined sulfuric acid for acidification of additional previously nonacid-treated cellulose and lignocellulose materials such as could be present in landfills to actively assist in decomposing these kinds of materials most effectively. Studies have shown that activated carbon and carbonaceous matter as is made present in these concerned lignocellulose substances which have been acidified with concentrated acids of sulfur and phosphorous contain such free acids upon their surfaces and thus permit easier wetting and acid reactivity than similar matter lacking any contents of free acid on the surfaces. Such activated carbon compounds coupled with a presence of a number of sulfated organic compounds like fatty alcohols, fatty acid amides, fatty acid esters, secondary alcohol sulfates, sulfated esters, and sulfated dibasic acids, among other sulfuric acid and phosphoric acid reactant products (being anionic surfactants and excellent wetting agents) give the cellulose and the cellulose esters in these products tremendous adsorption and surfactant capacities, even to the extent of their ability to adsorb suspensions along with enhancing easier and more complete decomposition of any halogenated organic matter which may be present in soils while working in conjunction with lignin fractions in the attraction and destruction of white rot fungi and several other undesirable fungal growths that may be present in soils.

Thus, the present invention relates to original and previously undisclosed compositions-of-matter along with the processes most suitable for use for their preparations. The invention includes multiple compositions, uses, and accompanying values, all illustrating new and very useful conversions of common waste material into useful compositions-of-matter.

The following examples are considered to be illustrative of my invention for converting wood wastes, waste paper, and any substance consisting essentially of cellulose-lignin-polysaccharides into dry, solid compositions-of-matter especially most suitable for use in the field of agricultural chemistry, but also applicable for use in other fields of chemistry.

EXAMPLE 1

250 mls. of a mixture of 50 mls. $H_3PO_4$ (85%) with 200 mls. of $H_2SO_4$ (98.5%) was added to 1 Kg. of sawdust (particle size ranging 100% from 4 to 20 mesh, U.S. Std. Sieve) having a predetermined moisture content of approximately 30–40%. The mixture of acids was poured in a constant stream during a 3–5 minute period of time while being thoroughly admixed with the sawdust. The resultant mixture was air dried between 225° and 300° F. temperature to produce 800 grams of free flowing, dry product containing 6.5% soluble and available $P_2O_5$, an acid equivalence expressed as percent $H_2SO_4$ of 47.2%, and a water solubility of 52.5%.

EXAMPLE 2

250 mls. of a mixture of 50 mls. $H_2SO_4$ (98.5%) with 200 mls. of $H_3PO_4$ (85%) was added to 1 Kg. of sawdust (having the same particle size and moisture content as noted in Example 1 above). The mixture of acids was poured in a constant stream during a 3–5 minute period of time while being thoroughly admixed with the sawdust. The resultant mixture was air dried between 225° and 300° F. temperature to produce 820 grams of free flowing, dry product containing 25.4% available $P_2O_5$, an acid equivalence expressed as percent $H_2SO_4$ of 38.1%, and a water solubility of 42.7%.

EXAMPLE 3

250 mls. of phosphoric acid (85% $H_3PO_4$) were added to 1 Kg. of sawdust (of the same particle size and moisture content as used in Example 1). The phosphoric acid was added, mixed with, and the resultant product dried also as noted in Examples 1 and 2 to produce a dry, free flowing product containing 32.5% soluble and available $P_2O_5$ and a water solubility of 44.7%.

EXAMPLE 4

300 grams of newspaper were macerated in water followed by removal of excess water by centrifugation to result in obtaining a wet paper pulp weighing 1460 grams to which was added 150 mls. of phosphoric acid (85% $H_3PO_4$) in a constant stream while thoroughly mixing the concentrated acid with the wet paper pulp. The resultant product was air dried at a temperature between 225° and 300° F. to produce 490 grams of dried product containing 31.8% soluble and available $P_2O_5$.

EXAMPLE 5

200 mls. of concentrated sulfuric acid (98.5% $H_2SO_4$) were added to 1100 grams of wood drillings of particle size ranging 100% between 4 and 20 mesh U.S. Standard Sieve which were wetted with water to induce a moisture content of approximately 35–40%. The resultant acidified product was air dried at a temperature of 250° F to produce 1030 grams of dry, granular product that had an acid equivalence expressed as percent sulfuric acid ($H_2SO_4$) of 35.2%.

EXAMPLE 6

200 mls. of phosphoric acid (85% $H_3PO_4$) were added to 580 grams of newspaper (clippings) which had been prewetted with 800 mls. of water. The phosphoric acid was thoroughly admixed with the wetted paper after which the resultant mixture was air dried at a temperature of approximately 250° F. to produce a dried product that contained 24.4% soluble and available $P_2O_5$.

The most exemplary as well as the most productive uses of the processes of this invention are found in the treatment of wastes commonly referred to as municipal solid wastes known as garbage, and in the treatment of sewage sludges as produced in municipal sewage treatment plants. Studies of "average" municipal garbage after glass, ferrous metals, and aluminum metal have been removed showed that garbage consists essentially of the following materials; 46.9% paper and cardboard, 8.5% wood, 8.4% food wastes, 3.5% textiles, 10.4% plastics, 20.3% yard waste, and a balance of approximately 2% of unidentified extraneous matter. In other words, garbage is composed of essentially cellulose and lignocellulosic materials for the most part. Municipal sewage sludges also contain large amounts of reactable cellulose lignocellulose in addition to having contents of human and animal wastes, soil, and extraneous matter. All of the samples of garbage and sewage sludges obtained from a number of sources demonstrated excellent amenabilities to being treated by the processes of the instant invention for their conversion either into materials most suitable for inclusion into landfills or into chemical products suitable for application to all types of agricultural soils to provide requisite plant nutrients in addition to being particularly useful for beneficiation of agricultural soils. In processing these wastes by use of this invention, the action of the concentrated acid used and the steam-heat generated when the concentrated acid is initially brought into contact as concentrated acid with the garbage or the sewage sludge (or even mixtures of these materials) is highly effective in destroying saprophytic matter such as fungi and molds as well as any bacteria and thermophilic organisms that may be present. The additional processing (following the initial incorporation of concentrated acid all at one time into the waste products under treatment) comprises "drying" the products at temperatures ranging between 225° and 300° F. During the drying step, moisture (as steam) is released from the products while the acid concentration is increased further. This guarantees total destruction of the most difficult to kill of all harmful organisms that may possibly have escaped sufficient exposure to the initial acid addition with its generation of steam heat in a very high acid content system. It is to be further noted that the oxygen contained in both the sulfate ($SO_4^=$) and the phosphate ($PO_4^{-3}$) radicals become available from these products when applied to soils. The oxygen radicals provide aerobic bacterial utilization to increase the rate of biological stabilization while at the same time assisting in the prevention of depletion of dissolved oxygen in soil which would lead to undesirable septic conditions with attendant evolution of foul (putrid) odors. With products of this invention derived from sewage sludges or like malodorous materials, the presence of the sulfate and/or phosphate radicals (previously noted) materially aid in oxidizing and detoxifying odorous sulfide sulfur compounds, amines, and benzopyrroles (from protein putrefaction) such as the chemical compounds indole and skatole (which cause the formidable odors from the benzopyrroles contained in most human waste matter). The mechanisms of the actions of the oxygen radicals are shown below:

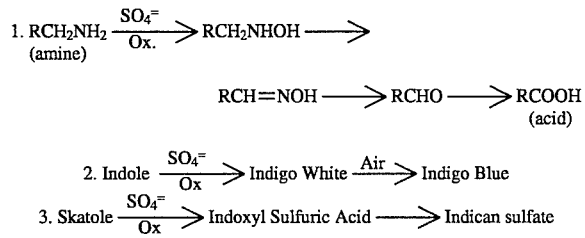

In view of the production of acetic acid from the reaction of the concentrated acid used with the cellulosic materials, the presence of the methoxyl group—($CH_3O^=$)—on the acetic acid increases ionization by facilitating separation of the hydroxylic hydrogen as a proton promoting electron attraction to further enhance detoxification of odorous entities contained in sewage sludges. The principal effect of the organic matter present in products derived from use of this invention is not solely for making agricultural soils acidic in nature, but primarily for use in increasing the soil buffering capacity of such soils. In arid land soils especially, very small amounts of organic matter are found present until such soils are brought into agricultural production through irrigation. Thus, many products derivable from use of this invention will be found to be of exceptional value for use on such soils, especially arid land soils having large contents of acid neutralizable alkali. On light sandy soils, the use of the concerned products will greatly increase water absorption, water retention, and water holding capacities as demonstrated in agricultural experimentation where irrigation requirements for drought sensitive crops were reduced by more than 75%. And, the use of the concerned products will greatly increase the supply of nutrient elements due to the amounts, the types, and the nature of the organic matter as shown by the various products abilities to absorb nutrients to be made slowly available as needed during the additional decomposition of the nutrient-containing organic matter over prolonged time periods. It should also be noted that the very high contents of organic matter possible in the concerned products along with their variable controlled contents of reactable acid and available oxygen makes for very large base exchange properties including the capacity to hold nutrient minerals (elements) in salt-like combination similar to clays. Further, as acid is consumed in neutralizing alkalinity, for example of alkaline soils, the neutral salt products formed in the process tend to be held on the faces of organic matter particles by adsorption rather than being released immediately to water solution to cause undesirable, unwanted increases in the presence of reactable soluble salt as demonstrated by increases in soil conductivity and by the harmful effects on crops growing in such soil systems which lack requisite amounts of organic matter to prevent salinization.

Although the products considered to be most basic to this invention have variable contents of both combined and uncombined sulfuric and/or phosphoric acids, in the event the products are designed for use for beneficiation of highly acidic type soils, the products (as formed by treatment of cellulose and/or lignocellulose with concentrated sulfuric and/or phosphoric acids) can be additionally treated with alkaline materials such as, for example, lime or limestone to neutralize some, any part of, or all of any content of free acids present in the organic matter product under consideration. If desired, sufficient amounts of calcium oxide (CaO) containing materials can be added so that the resultant product can be made to contain water soluble acid or neutral salts of sulfates and/or phosphates along with organic matter-adsorbed calcium for use in treatment of lime deficient acid type soils. The advantage of using products such as the cellulosic materials used in the instant invention is that a large amount and number of acidic organic groups held together in large molecular aggregates as represented by cellulose and lignin acid sulfate and acid phosphate esters (after being treated with the concentrated acids described) present in soils as organic matter structures are highly resistant to attack and immediate destruction by microorganisms. Thus, the presence of such organic groups act to improve overall soil structures, while interacting with surfaces of clay minerals present in the soil and providing soil nutrients and soil beneficiation all at the same time.

This invention was developed primarily to provide processes to permit the useful disposition of waste matter by converting such matter into useful agricultural chemicals. However, it was anticipated that if the amounts of available waste exceed the amount that could and would be used in converted forms as agricultural chemicals, then one of the prime values of the invention from acidification of the waste cellulosic matter with concentrated acids would be derived since the acidification process of itself results in a 30% to 65% reduction of the overall volumes, in most cases, of such wastes processed. This volume reduction alone would, at least on average, double the volume of landfill availability. At the same time, since the product can be made to contain defined amounts of available acid in terms of either, or both, concentrated sulfuric or phosphoric acids, and this available acid will react with previously untreated cellulose, lignocellulose, carbohydrates, and proteinaceous matter already present in landfills to degrade such materials, their volumes in turn will be reduced and the presence of the oxidative $SO_4^=$ (sulfate) and $PO_4^=$ (phosphate) radicals will allay the possibility of toxicity and assist in the conversion of malodorous matter by oxidation into non-odorous matter.

The following examples are illustrative of the use of the processes of this invention to convert waste materials such as municipal garbages and municipal sewage sludges into useful agricultural chemical products, or if desired into products highly suitable for use in landfill operations.

EXAMPLES OF PROCESSING SAMPLES OF ASSORTED GARBAGE*

| SAMPLE | WEIGHT PROCESSED | VOLUME PROCESSED | TREATED WITH | WEIGHT OF PRODUCT OBTAINED | VOLUME OF PRODUCT OBTAINED | PRINCIPAL COMPONENTS OF PRODUCTS |
|---|---|---|---|---|---|---|
| #1. | 300 gms. | 25.4 ozs. | 88 gms. 98+% $H_2SO_4$ | 163 gms. | 11 ozs. | Organic Matter +54% equiv. as $H_2SO_4$ |
| #2. | 400 gms. | 22.0 ozs. | 176 gms. 98+% $H_2SO_4$ | 226 gms. | 13 ozs. | Organic Matter +77% equiv. as $H_2SO_4$ |
| #3. | 400 gms. | 22.0 ozs. | 176 gms. 98+% $H_2SO_4$ +53 gms. $CaCO_3$ | 229 gms. | 12.5 ozs. | Organic Matter +54% equiv. as $H_2SO_4$ +18% equiv. as CaO |
| #4. | 420 gms. | 32.0 ozs. | 88 gms. 98+% $H_2SO_4$ +60 gms. $CA_3(PO_4)_2$ | 276 gms. | 19.0 ozs. | Organic Matter +9% Available $P_2O_5$ +39% equiv. as $H_2SO_4$ |
| #5. | 300 gms. | 24.8 ozs. | 44 gms. 98+% $H_2SO_4$ + 15 gms. $NH_3$ gas | 200 gms. | 14.0 ozs. | Organic Matter +30% $(NH_4)_2SO_4$ (6% available N) |
| #6. | 300 gms. | 25.0 ozs. | 88 gms 98+% | 300 gms. | 16.0 ozs. | Organic Matter +23% Available $P_2O_5$ |

EXAMPLES OF PROCESSING SAMPLES OF ASSORTED GARBAGE*

| SAMPLE | WEIGHT PROCESSED | VOLUME PROCESSED | TREATED WITH | WEIGHT OF PRODUCT OBTAINED | VOLUME OF PRODUCT OBTAINED | PRINCIPAL COMPONENTS OF PRODUCTS |
|---|---|---|---|---|---|---|
| | | | $H_2SO_4$ +99 gms. 85% $H_3PO_4$ +20 gms. $NH_3$ gas | | | +10% Available N +30% equiv. as $H_2SO_4$ |

*The water contents of the "as received" macerated, ground, and semi-comminuted waste of assorted particle sizes ranging from approximately 2 mesh to minus 200 mesh U.S. Std. Sieve Size was adjusted to approximately 35% to 45% water content before the weights of acid shown above for the various samples was added in its most concentrated form in one continuous addition while being admixed with the noted weight of garbage indicated after which the resultant product was dried at resultant product was dried at temperatures in the range of 225° to 300° F.. Items other than concentrated sulfuric acid shown above in the column "treated with" were added after the initial addition of concentrated sulfuric acid was thoroughly combined with the garbage in the order listed where the ammonia gas (anhydrous) was added last as a combination acid neutralizer and drying agent to assist in granulation of the final product to optimum size while drying took place in the temperature range of 225° to 300° F.

EXAMPLES OF PROCESSING SAMPLES OF ASSORTED SEWAGE SLUDGE*

| SAMPLE | WEIGHT PROCESSED | VOLUME PROCESSED | TREATED WITH | WEIGHT OF PRODUCT OBTAINED | VOLUME OF PRODUCT OBTAINED | PRINCIPAL COMPONENTS OF PRODUCTS |
|---|---|---|---|---|---|---|
| #1. | 200 gms. | 15.6 ozs. | 18 gms. 98+% $H_2SO_4$ | 156 gms. | 7.6 ozs. | Organic Matter +11% equiv. as $H_2SO_4$ |
| #2. | 100 gms. | 7.6 ozs. | 9 gms. 98+% $H_2SO_4$ +15 gms. $CaCO_3$ | 100 gms. | 8.0 ozs. | Organic Matter +5.1% eq. CaO |
| #3. | 400 gms. | 37.6 ozs. | 215 gms. 98+% $H_2SO_4$ +400 gms. $CaCO_3$ | 695 gms. | 43 ozs. | Organic Matter +17.6 equiv. as CaO |
| #4. | 200 gms. | 16.6 ozs. | $H_3PO_4$ 85% 16 gms. +22 gms. Urea | 200 gms. | 17.0 ozs. | Organic Matter +5% Available $P_2O_5$ + 5% N |
| #5. | 300 gms. | 22.0 ozs. | 72 gms. 98+% $H_2SO_4$ | 290 gms. | 14.9 ozs. | Organic Matter +24% equiv. as $H_2SO_4$ |

*The water contents of the "as received" macerated, ground, and semi-comminuted sewage sludge samples of assorted particle sizes ranging from approximately one-half (½) inch to minus 250 mesh U. S. Std. Sieve Size was adjusted to approximately 35% to 45% water content prior to the weights of acid shown in the above table being added in one continuous addition while being thoroughly admixed with the weights of sewage sludge noted for the various samples processed. Additional samples processed. Additional items shown in the column "treated with" were incorporated into the acidified sewage sludge in the order shown and thoroughly combined prior to the resultant products being air dried at temperatures in the range of 225° to 300° F.

Further, the foregoing should be considered as illustrative only of the principles of the invention. Since numerous applications of the present invention will readily occur to those skilled in the art, it is not desired to limit the invention to the specific examples disclosed or the exact construction and operation shown and described. Rather, all suitable modifications and equivalents may be resorted to, falling within the scope of the invention.

What is claimed:

1. A process for treating lignocellulose or cellulose containing materials comprising applying a concentrated acid selected from the group consisting of concentrated sulfuric acid, concentrated phosphoric acid and mixtures thereof in a constant stream to said materials to thoroughly admix said concentrated acid and said materials, and drying the resultant mixture at a temperature between about 225° and 300° F.

2. The process of claim 1 wherein the concentrated acid is sulfuric acid having a concentration of about 93 to 98.5% $H_2SO_4$.

3. The process of claim 1 wherein the concentrated acid is phosphoric acid having a concentration of about 75 to 85% $H_3PO_4$.

4. The process of claim 1 wherein the materials have a particle size of about 4 to 20 mesh U.S. Standard Sieve.

5. The process of claim 1 wherein the materials have a moisture content of about 30 to 40%.

6. The process of claim 1 wherein the concentrated acid is poured as a constant stream on said materials during an about 3 to 5 minute period of time.

7. The process of claim 1 wherein the resultant mixture is air dried.

8. The process of claim 1 wherein the materials are selected from the group consisting of wood and paper.

9. The process of claim 1 wherein the materials are selected from the group consisting of sawdust and newsprint.

10. The process of claim 1 wherein the materials are selected from the group consisting of garbage and sewage sludge.

11. The process of claim 1 wherein the resultant mixture contains between a fraction and about 60% of the concentrated acid.

12. The process of claim 1 wherein the dried resultant mixture is neutralized with alkaline materials.

13. The process of claim 1 wherein the dried resultant mixture is reacted with lime, limestone or calcium oxide.

14. The process of claim 1 wherein the dried resultant mixture is reacted with urea.

15. The process of claim 1 wherein the dried resultant mixture is added to tricalcium phosphate.

16. The process of claim 1 wherein the dried resultant mixture is used to treat agricultural soil.

17. The process of claim 1 wherein the dried resultant mixture is used as a landfill material.

18. A process for treating waste materials selected from the group consisting of wood waste, paper waste, garbage and sewage sludge comprising pouring a concentrated acid selected from the group consisting of concentrated sulfuric acid having a concentration of about 93 to 98.5% by weight, concentrated phosphoric acid having a concentration of about 75 to 85% and mixtures thereof in a constant stream on said waste materials to thoroughly admix said concentrated acid and said waste materials, and drying the resultant mixture at a temperature between about 225° and 300° F.

19. The process of claim 18 wherein the materials have a particle size of about 4 to 20 mesh U.S. Standard Sieve.

20. The process of claim 18 wherein the materials have a moisture content of about 30 to 40%.

21. The process of claim 18 wherein the resultant mixture contains between a fraction and about 60% of the concentrated acid.

22. The process of claim 18 wherein the dried resultant mixture is neutralized with alkaline materials.

23. The process of claim 18 wherein the dried resultant mixture is used to treat agricultural soil.

24. The process of claim 18 wherein the dried resultant mixture is used as a landfill material.

25. A product for treating agricultural soil or for use as a landfill material prepared by the process of applying a concentrated acid selected from the group consisting of concentrated sulfuric acid, concentrated phosphoric acid and mixtures thereof in a constant stream to lignocellulose or cellulose containing materials to thoroughly admix said concentrated acid and said materials, and drying the resultant mixture at a temperature between about 225° and 300° F.

26. The product of claim 25 wherein the concentrated acid is sulfuric acid having a concentration of about 93 to 98.5% $H_2SO_4$.

27. The product of claim 25 wherein the concentrated acid is phosphoric acid having a concentration of about 75 to 85% $H_3PO_4$.

28. The product of claim 25 wherein the materials have a particle size of about 4 to 20 mesh U.S. Standard Sieve.

29. The product of claim 25 wherein the materials have a moisture content of about 30 to 40%.

30. The product of claim 25 wherein the concentrated acid is poured as a constant stream on said materials during an about 3 to 5 minute period of time.

31. The product of claim 25 wherein the materials are selected from the group consisting of wood and paper.

32. The product of claim 25 wherein the materials are selected from the group consisting of garbage and sewage sludge.

33. The product of claim 25 wherein the dried resultant mixture is neutralized with alkaline materials.

\* \* \* \* \*